(12) United States Patent
Das et al.

(10) Patent No.: US 9,788,481 B2
(45) Date of Patent: Oct. 17, 2017

(54) ROBOTIC MOWER NAVIGATION SYSTEM

(71) Applicant: Deere & Company, Moline, IL (US)

(72) Inventors: Colin E. Das, Mount Prospect, IL (US); David A. Johnson, Durham, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/525,302

(22) Filed: Oct. 28, 2014

(65) Prior Publication Data

US 2016/0113195 A1    Apr. 28, 2016

(51) Int. Cl.
*A01D 34/00* (2006.01)
*G05D 1/02* (2006.01)

(52) U.S. Cl.
CPC ......... *A01D 34/008* (2013.01); *G05D 1/0225* (2013.01); *G05D 1/0261* (2013.01); *G05D 1/0265* (2013.01); *G05D 2201/0208* (2013.01)

(58) Field of Classification Search
CPC ... A01D 34/008; G05D 1/0265; A01B 69/008
USPC ...................... 701/22, 23; 700/258, 248, 245
See application file for complete search history.

(56) References Cited

U.S. PATENT DOCUMENTS

| | | | | |
|---|---|---|---|---|
| 5,974,347 A * | 10/1999 | Nelson | ................ | A01D 34/008 180/168 |
| 6,009,358 A * | 12/1999 | Angott | ................ | A01D 34/008 180/168 |
| 6,321,515 B1 * | 11/2001 | Colens | ................ | A01D 34/008 56/10.2 A |
| 7,079,943 B2 * | 7/2006 | Flann | ................... | A01B 69/008 172/4.5 |
| 7,170,252 B2 | 1/2007 | Maeki | | |
| 8,027,761 B1 * | 9/2011 | Nelson | ................ | A01D 34/008 180/168 |
| 8,352,113 B2 * | 1/2013 | Johnson | ............... | A01D 34/008 318/568.12 |
| 8,954,193 B2 * | 2/2015 | Sandin | ................... | G05D 1/028 700/245 |
| 9,237,689 B2 * | 1/2016 | Choi | ..................... | A01D 34/008 |
| 2005/0267629 A1 * | 12/2005 | Petersson | ............. | A01D 34/008 700/245 |

(Continued)

FOREIGN PATENT DOCUMENTS

EP    2172825 A1    4/2010
WO    88/04081    6/1988

(Continued)

OTHER PUBLICATIONS

Search Report issued in counterpart application No. GB1518827.9, dated Mar. 15, 2016 (5 pages).

*Primary Examiner* — Thomas G Black
*Assistant Examiner* — Wae Louie

(57) ABSTRACT

A robotic mower navigation system has a plurality of landmark tags sequentially spaced along or inside a boundary wire. Each landmark tag has a unique identifier. The robotic mower has a detector for detecting the landmark tags, and a vehicle control unit having memory storing data for each of the landmark tags including the unique identifiers, a departure angle and a distance from the landmark tag to another non-sequential landmark tag. The vehicle control unit determines the shortest route to a specified destination based on the stored landmark tag data.

14 Claims, 5 Drawing Sheets

(56) References Cited

U.S. PATENT DOCUMENTS

| | | | |
|---|---|---|---|
| 2008/0183349 A1* | 7/2008 | Abramson | A01D 34/008 701/23 |
| 2009/0030551 A1* | 1/2009 | Hein | G05D 1/024 700/253 |
| 2011/0153338 A1* | 6/2011 | Anderson | G01S 1/68 705/1.1 |
| 2011/0190931 A1* | 8/2011 | Anderson | A01D 34/008 700/253 |
| 2011/0295423 A1* | 12/2011 | Anderson | G05D 1/0088 700/248 |
| 2013/0041526 A1 | 2/2013 | Ouyang | |
| 2013/0192183 A1 | 8/2013 | Choi et al. | |
| 2014/0012453 A1* | 1/2014 | Johnson | G05D 1/0219 701/23 |
| 2014/0100693 A1 | 4/2014 | Fong et al. | |
| 2014/0379196 A1* | 12/2014 | Da Rocha | A01D 34/008 701/26 |
| 2015/0234385 A1* | 8/2015 | Sandin | G05D 1/0265 700/258 |

FOREIGN PATENT DOCUMENTS

| | | |
|---|---|---|
| WO | 94/28436 | 12/1994 |
| WO | 2007/091967 A1 | 8/2007 |
| WO | 2011/115563 A1 | 9/2011 |

* cited by examiner

ROBOTIC MOWER NAVIGATION SYSTEM

FIELD OF THE INVENTION

This invention relates to robotic lawn mowers, and more specifically to a robotic mower navigation system.

BACKGROUND OF THE INVENTION

Robotic mowers may follow a path along or adjacent a boundary wire while returning to a docking station or other specified location. Repeatedly following the same path along the boundary can cause damage and ruts due to wear from the robotic mower's wheels contacting the turf in the same place. Additionally, a path along the boundary wire may be lengthy and indirect. This is inefficient because the robotic mower consumes time and energy, and the robotic mower components are subject to wear. There is a need for an improved robotic mower navigation system that reduces turf damage and improves efficiency.

SUMMARY OF THE INVENTION

A robotic mower navigation system includes a boundary sensor on a robotic mower that senses the departure angle relative to a boundary wire or other known axis, and a vehicle control unit having memory that stores the angle and distance between each landmark tag and one or more other non-sequential landmark tags. The vehicle control unit directs the robotic mower from any location to a specified destination such as a docking station using the distance and the angle data.

DESCRIPTION OF THE PREFERRED EMBODIMENT

This application hereby incorporates by reference the disclosures of U.S. patent application Ser. No. 12/845,362 filed Jul. 28, 2010 entitled Robotic Mower Boundary Coverage System, issued as U.S. Pat. No. 8,352,113; and U.S. patent application Ser. No. 13/544,277 filed Jul. 9, 2012 entitled Navigation System and Method for Autonomous Mower.

Figure 1:
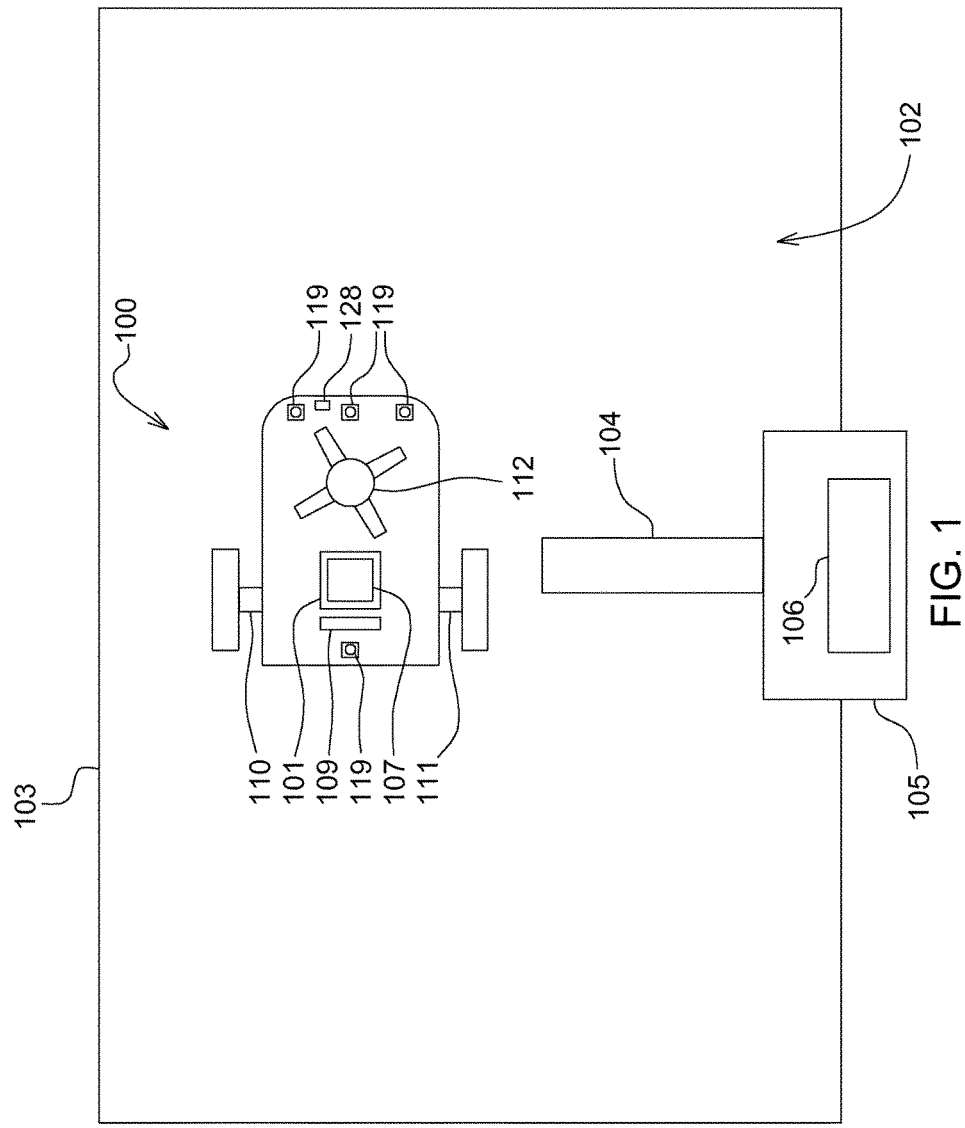
FIG. 1 is schematic drawing of a robotic mower within a main boundary wire according to a first embodiment of the invention.

In one embodiment shown in FIG. 1, the robotic mower navigation system may include robotic mower 100 powered by battery pack 109 that may be charged periodically at charging station 105. Vehicle control unit 101 may control all of the electronic functions of the robotic mower. For example, vehicle control unit 101 may command a pair of traction motors 110, 111 to turn traction drive wheels, blade motor 112 to rotate a cutting blade or blades, battery pack 109, a user interface module 107 and various sensors.

In one embodiment, the robotic mower navigation system may be executed by vehicle control unit 101 which may be a printed circuit board assembly that serves as the main control board for the robotic mower. The vehicle control unit may interpret and process information from various sensors, and use that information to control and operate the pair of traction motors to drive the robotic mower over a yard in order to maintain the lawn, and to drive the blade motor. For example, the vehicle control unit may be connected to a number of sensors including one or more boundary sensors 119, as well as one or more obstacle sensors or accelerometers. The vehicle control unit also may communicate with the battery pack in order to monitor the status of the battery pack to maintain a charge for one or more lithium ion batteries in the battery pack. The vehicle control unit also may be connected to a user interface module 107 including an LCD display along with several indicator lights and key buttons for operator input.

In one embodiment, the robotic mower navigation system may include a vehicle control unit that is connected to traction motor controllers for each of the left and right traction motors 110, 111. The vehicle control unit may have inputs which receive signals from Hall Effect rotor position sensors for each traction motor. The vehicle control unit may sense the speed of each traction motor using a feedback from a Hall Effect sensor, may sense the current through the phases of the traction motors, and may use odometry to determine the distance traveled.

Still referring to FIG. 1, in one embodiment, the robotic mower navigation system may be implemented in a specified area 102 that may be surrounded by main or outer boundary wire 103 which may form a loop positioned at or below the ground or turf surface. Additionally, inner wire 104 may be a shorter loop provided within the area of the main boundary wire where charging station 105 is positioned. The main boundary wire and inner wire may be connected to charging station 105.

In one embodiment, a boundary drive circuit 106 may be contained in charging station 105, and may drive signals through the main boundary wire 103 and the inner wire 104. The fundamental frequency of the waveform on the main boundary wire is preferably about 2 kHz and the robotic mower 100 may have at least one boundary wire sensor assembly 119 that detects the waveform and provides a signal to the vehicle control unit 101 to indicate the orientation, and optionally, the distance, of the sensor assembly to the main boundary wire 103.

Figure 2:
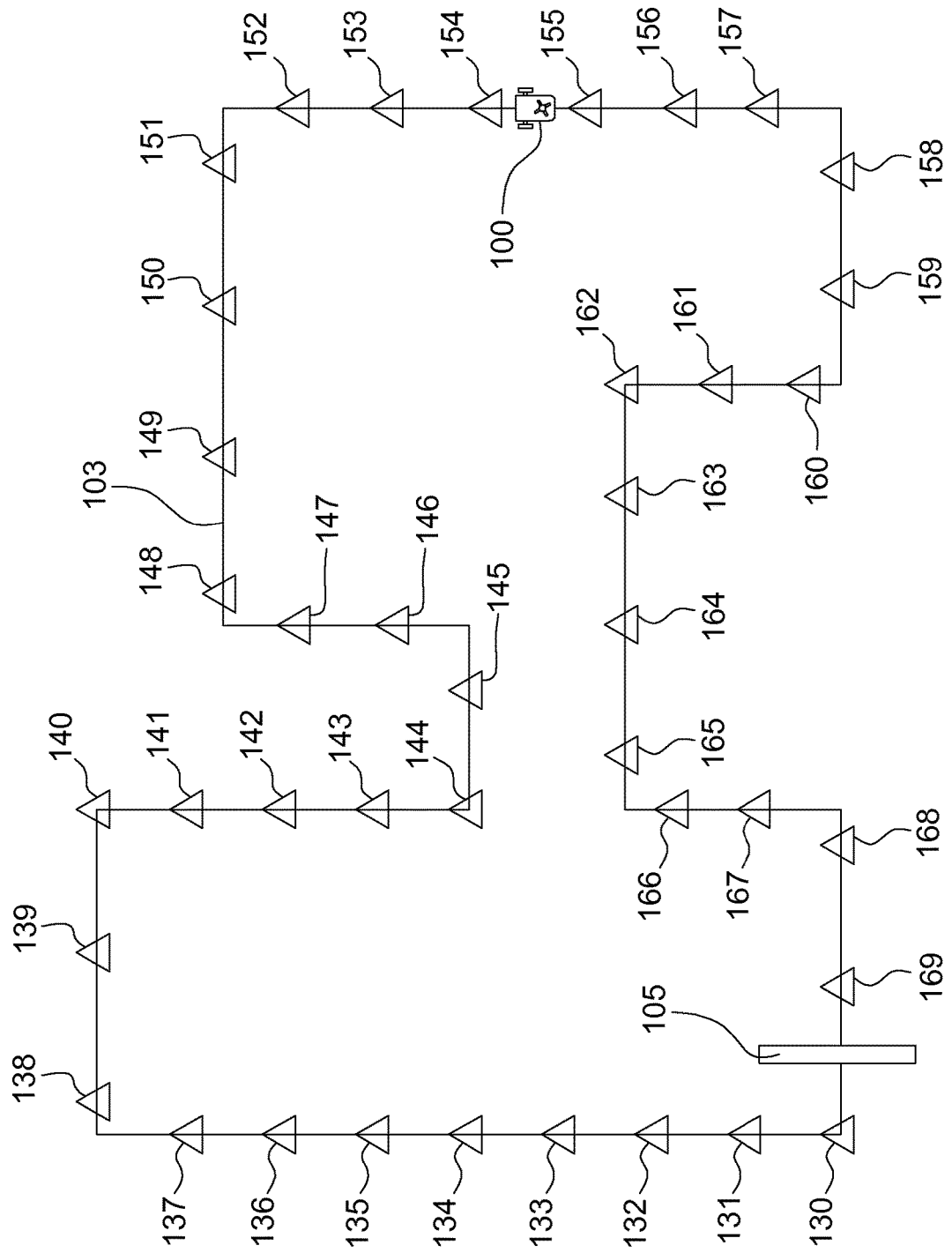
FIG. 2 is a schematic drawing of the robotic mower navigation system including a robotic mower on a main boundary wire with landmark tags during the first phase of landmark tag data collection according to a first embodiment of the invention.

In one embodiment, as shown in FIG. 2, the robotic mower navigation system may include a plurality of uniquely identifiable landmark tags 130-169 that may be installed along, adjacent or inside the boundary wire. A unique identifier for each landmark tag may be provided, such as a number or code. The most cost effective and reliable landmark tags are believed to be passive RFID tags with a read or detection range of about 20 cm. The detection range should be a shorter distance than the spacing between sequential landmark tags. RFID tags may be attached directly to the boundary wire, or attached to stakes which pin the boundary wire to the ground. However, the landmark tags may have a variety of other forms and may be used in a variety of ways. For example, instead of passive, unpowered RFID tags, the landmark tags may be active and/or powered. The landmark tags also may vary in antenna shape and size, and may use ultrasonic or radio signals instead of RFID signals. Various alternatives may have different detection ranges. The landmark tags may be spaced at regular intervals along or adjacent the boundary wire, such as every 2 meters. However, the spacing of landmark tags may be more or less than 2 meters, and landmark tags also may be placed within the mowing area instead of only along the boundary wire.

In one embodiment, each boundary wire sensor assembly 119 on the robotic mower may measure the angle or orientation of the robotic mower with respect to the boundary wire or another known axis or reference frame. Optionally, the boundary wire sensor assembly also may measure the distance of the robotic mower to the boundary wire. For example, a boundary wire sensor assembly may have at least two, and preferably three pickup coils arranged in different orientations, as described in U.S. patent application Ser. No. 13/544,277. Vehicle control unit 101 may evaluate analog amplitudes of the magnetic field to calculate the orientation of boundary sensor assembly 119. The vehicle control unit may be programmed to turn the robotic mower around at a specified distance from the boundary wire that is within the range of the boundary sensor assembly. For example, the vehicle control unit may command the traction drive motors to start a turn at a specified distance from the boundary wire before the robotic mower reaches the boundary wire. Alternatively, the vehicle control unit may command the traction drive motors to turn the robotic mower around after it reaches the boundary wire.

In one embodiment, the robotic mower navigation system may include a vehicle control unit having software and/or hardware that determines and specifies the angle of departure of the robotic mower from the boundary wire or other known axis. The angle of departure also may be referred to as the yaw angle. The angle may be any specified angle, or randomly generated angle, or may be based at least in part on the angle of approach of the robotic mower to the boundary wire. For example, the departure angle may be the same as, or a mirror reflection of, the approach angle with respect to the boundary wire.

In one embodiment, the robotic mower navigation system may include one or more landmark tag detectors 128. The landmark detector(s) may be mounted inside or to the body of the robotic mower. For example, each detector may be a (UHF) RFID reader. Alternatively, the detector may detect ultrasonic or radio signals instead of RFID signals.

In one embodiment, the robotic mower navigation system may include a vehicle control unit that collects and stores a map or table of landmark tag data. For example, the vehicle control unit may collect and store landmark tag data during a first phase and a second phase, as explained below. The vehicle control unit may include sufficient memory for retaining the map or table of landmark data through power cycles, and may build up the map or table of data over time as the robotic mower is used and encounters landmark tags from different directions and/or angles.

In one embodiment, the robotic mower navigation system may include a first phase of landmark tag data collection as shown in FIG. 2. In the first phase, robotic mower 100 may follow along boundary wire 103 in either a clockwise or counter clockwise direction. During the first phase, the vehicle control unit may collect and store data regarding the sequence and identification of landmark tags numbered consecutively as 130-169 along the boundary wire. Each time the detector on the robotic mower detects a landmark tag, the vehicle control unit may store the unique identifier for that landmark tag. During the first phase, the vehicle control unit also may collect and store the distance between sequential landmark tags. For example, the vehicle control unit may use odometery to determine the distance traveled between landmark tags, such as a Hall Effect sensor that tracks and records revolutions of one or both electric traction drive motors. In this way the vehicle control unit may generate a portion of a map or table listing the landmark tags in sequence.

Figure 3:
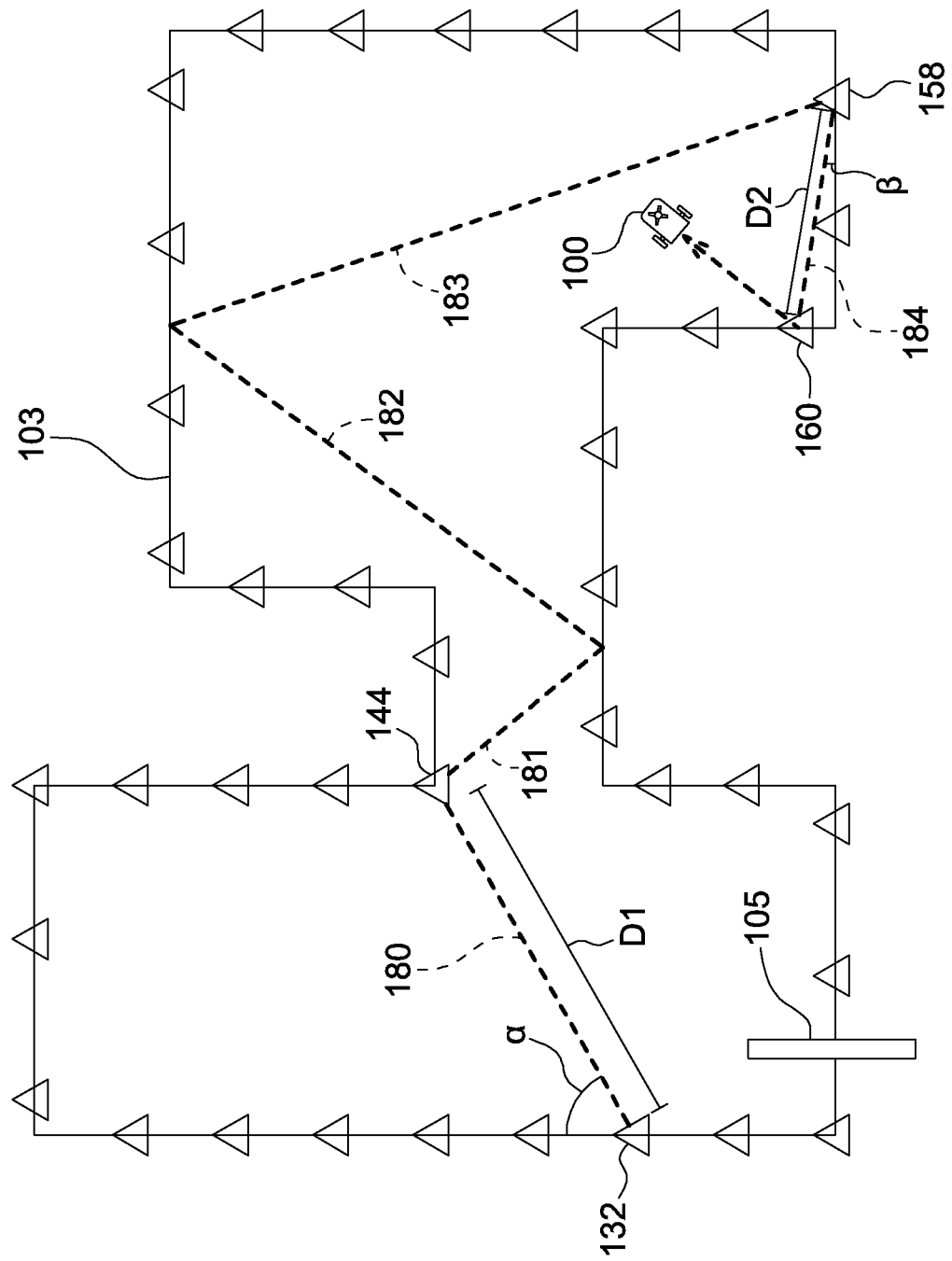
FIG. 3 is a schematic drawing of the robotic mower navigation system including a robotic mower inside a main boundary wire with landmark tags during the second phase of landmark tag data collection according to a first embodiment of the invention.

In one embodiment, as shown in FIG. 3, the robotic mower navigation system may include a second phase of landmark data collection wherein the robotic mower makes a plurality of passes inside the boundary wire. During the second phase, the vehicle control unit may collect and store data concerning the heading or departure angle and distance between non-sequential landmark tags. Each time robotic mower 100 detects a landmark tag, the vehicle control unit may store the first landmark tag identifier (for example, landmark tag 132) and the departure heading angle α for the next pass (for example, pass number 180). At the end of pass 180, the landmark tag detector on the robotic mower may or may not detect another landmark tag. If the robotic mower detects another landmark tag (for example, landmark tag 144), the vehicle control unit may store the second landmark tag identifier, and the distance D1 traveled from head to tail using odometry, i.e., a Hall effect sensor may measure and provide revolutions of one or both electric traction drive motors. If a landmark tag is not detected at the finish of a pass, the vehicle control unit will not store the landmark tag identifiers, heading or departure angle, or distance. For example, the vehicle control unit will not store data for passes 181, 182 and 183 in FIG. 3, because it did not detect landmark tags at the start and/or finish of each pass. However, the vehicle control unit would store data, including landmark tag identifiers 158 and 160, departure angle 13, and distance D2, for pass 184.

Figure 4:
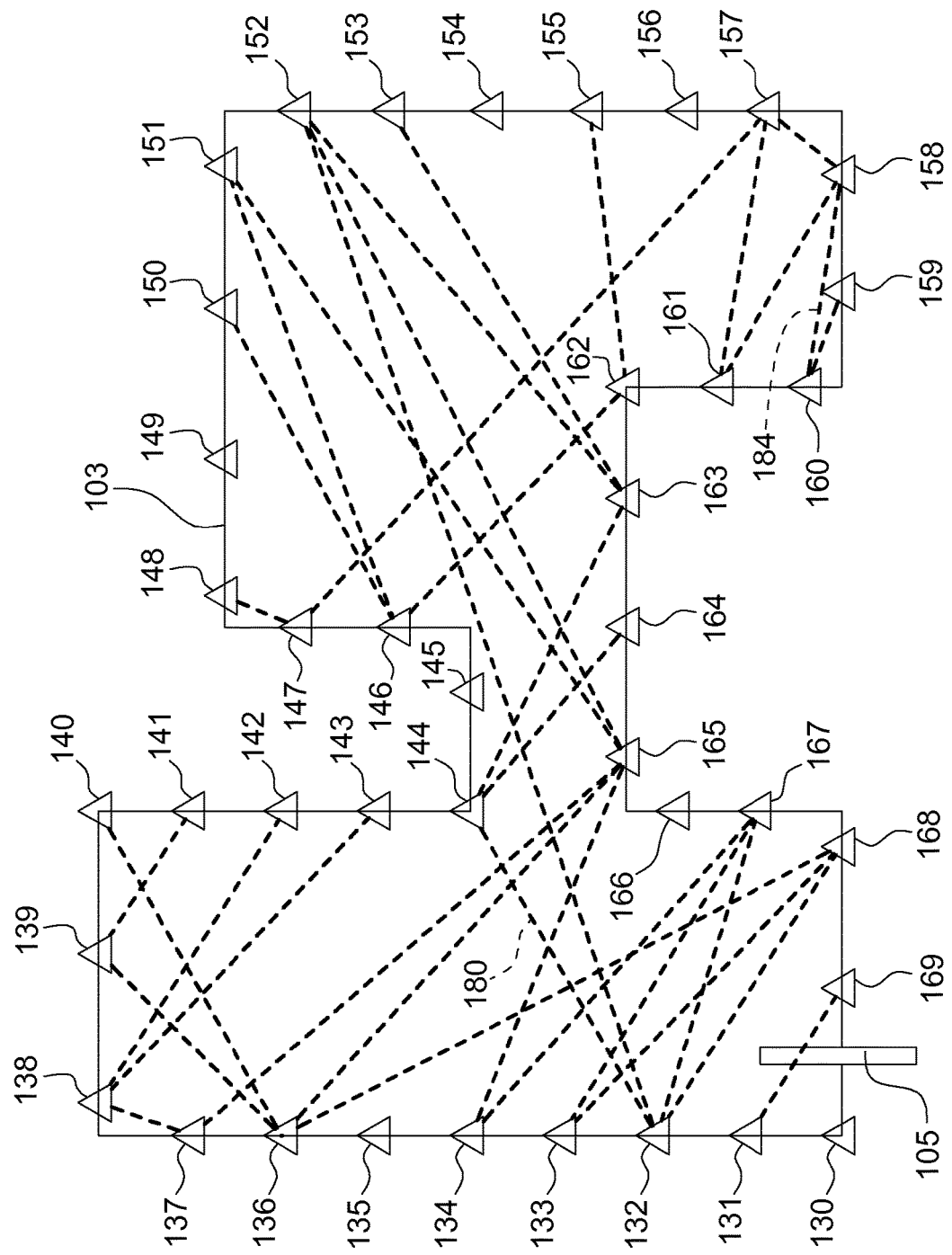
FIG. 4 is a schematic drawing of the robotic mower navigation system including a main boundary wire with passes between non-sequential landmark tags stored during the first and second phases of landmark tag data collection.

In one embodiment, as shown schematically in FIG. 4, the robotic mower navigation system may include a vehicle control unit that constructs and stores a map or table of landmark tag data. The map or table may include a plurality of head and tail landmark tag identifiers, heading or departure angles from each head landmark tag to one or more tail landmark tags, and distance traveled from the head to tail during the pass. For example, the stored landmark data includes landmark tag identifiers, heading or departure angles, and distances for pass numbers 180 and 184. FIG. 4 represents the data in graphical form, where the landmark tag identifiers are numbered 130-169, and the distances between the landmark tags are shown as dashed lines.

In one embodiment, the robotic mower navigation system may include a vehicle control unit having logic that uses the stored data to determine the shortest or optimal route to a destination such as docking or charging station 105, or to a specified landmark tag for a launch point where the robotic mower will operate. The vehicle control unit then may direct the robotic mower to follow the route based on an internal or an external request. For example, the vehicle control unit may request the robotic mower to execute the navigation system to return to the docking or charging station, or the owner or operator may request the robotic mower to execute the navigation system to travel to a specified launch point or area to mow. Additionally, the vehicle control unit may execute the navigation system even before it has completed phase two of data collection.

Figure 5:
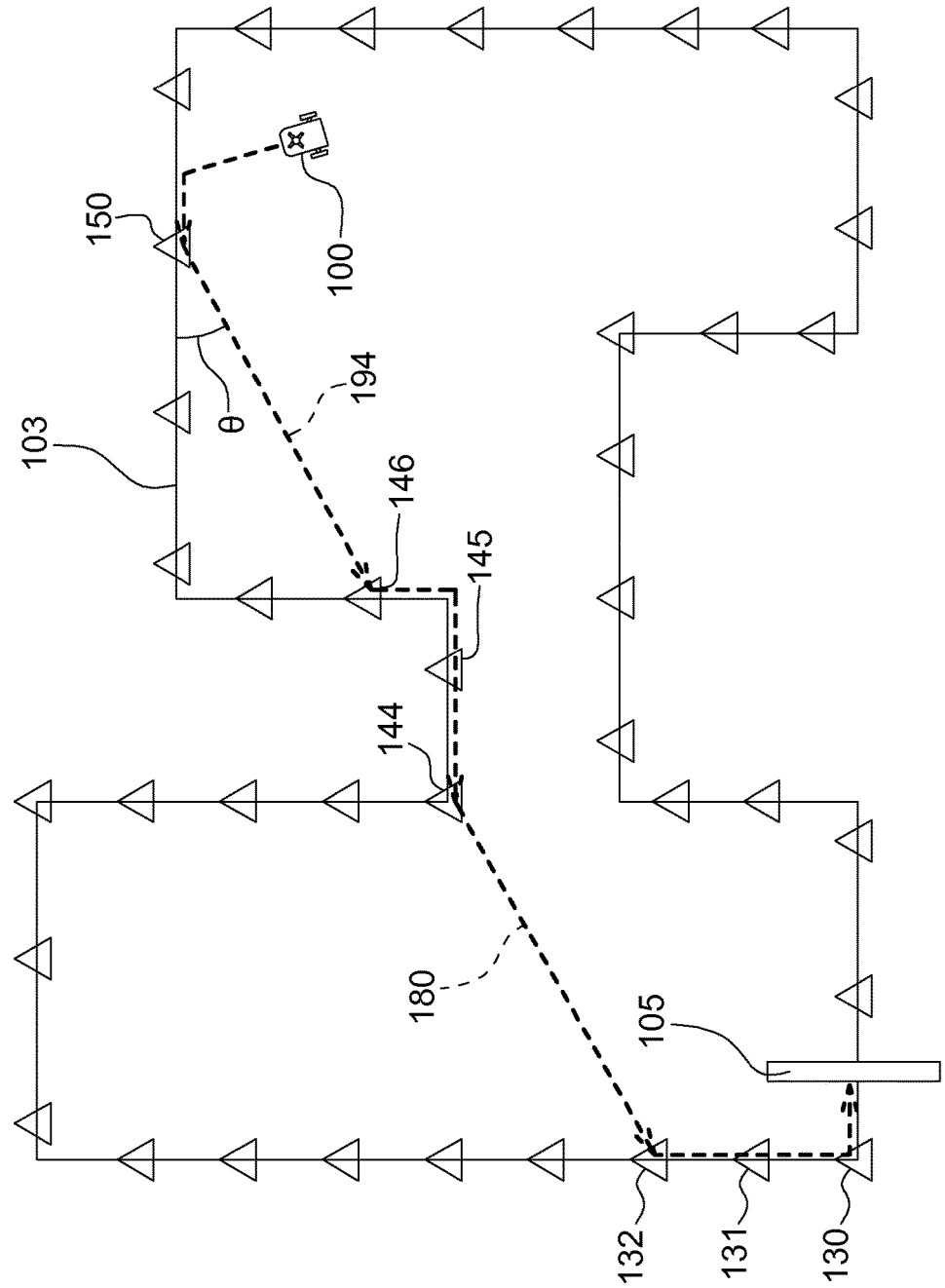
FIG. 5 is a schematic drawing of the robotic mower navigation system including a robotic mower returning to a docking station using the shortest or optimal route selected by the vehicle control unit.

In one embodiment, the robotic mower navigation system may include a vehicle control unit that, when receiving a request to execute the navigation system, may determine if main boundary wire 103 is within the detection range of boundary sensors 119. As shown in FIG. 5, the vehicle control unit may command the traction drive motors to drive toward a nearby point on boundary wire 103 or other location where a landmark tag may be located. If the boundary wire is outside the detection range, the vehicle control unit may command the traction drive motors to drive the robotic mower forward on the same pass or current heading until the robotic mower reaches boundary wire 103. The vehicle control unit then may command the traction drive motors to drive the robotic mower along the boundary wire to the first detectable landmark tag, such as landmark tag 150 in FIG. 5.

In one embodiment, the robotic mower navigation system may include a vehicle control unit having logic that determines the shortest or optimal route from the robotic mower's current location to a specified destination such as the docking station. The shortest or optimal route is based on landmark tag data stored in the vehicle control unit's memory. The vehicle control unit looks up the first landmark tag (landmark tag 150 in FIG. 5) and the map or table in memory may include departure angles from the first landmark tag to one or more tail landmark tags, and distances to each of the tail landmark tags. The vehicle control unit may select a tail landmark tag (landmark tag 146) that is on the shortest or optimal route to the destination. For example, the vehicle control unit may use one or more algorithms such as Dijkstra's algorithm or an A* search to determine the shortest route following landmark tags to the destination. The traction control unit then may command the traction unit to drive the robotic mower at the departure angle or heading from the first landmark tag. For example, departure angle θ for pass 194 to landmark tag 146. The second or tail landmark tag may be a non-sequential landmark tag, or may be a sequential landmark tag along the boundary wire next to the first landmark tag. In FIG. 5, the vehicle control unit selected sequential landmark tags 145 and 144 along the boundary wire. The vehicle control unit may repeat this process at each landmark tag to select the next landmark tag on the optimal or shortest route, and command the traction unit to drive the robotic mower along the boundary wire or at the specified departure angle to the next landmark tag, until the robotic mower reaches the destination. Alternatively, the vehicle control unit, at the first landmark tag, may select a series of landmark tags and departure angles that combine to provide the shortest or optimal route, instead of selecting each landmark tag one at a time.

In one embodiment, the robotic mower navigation system may include a vehicle control unit that records and tracks the total distance traveled by the robotic mower during execution of the navigation system. For example, if the vehicle control unit determines the total distance traveled on the route exceeds the perimeter of the boundary wire, or detects the same landmark tag again, the vehicle control unit may command the traction drive to default to a homing procedure that follows along the boundary wire to the destination.

Having described the preferred embodiment, it will become apparent that various modifications can be made without departing from the scope of the invention as defined in the accompanying claims.

The invention claimed is:

1. A robotic mower navigation system, comprising:
    a plurality of landmark tags sequentially spaced along a boundary wire, each landmark tag having a unique identifier;
    a robotic mower having a detector for detecting the landmark tags; and
    a vehicle control unit on the robotic mower that directs the robotic mower to follow the boundary wire and determines a distance between the sequentially spaced landmark tags, and that directs the robotic mower to make a plurality of passes inside the boundary wire and determines a departure angle and a distance between each landmark tag and at least one non-sequentially spaced landmark tag, and determines a shortest route between the landmark tags to a specified destination.

2. The robotic mower navigation system of claim 1 wherein the specified destination is a robotic mower docking station.

3. The robotic mower navigation system of claim 1 wherein the specified destination is a landmark tag for a launch point.

4. The robotic mower navigation system of claim 1 wherein the landmark tags are passive RFID tags.

5. The robotic mower navigation system of claim 1 wherein the vehicle control unit commands a traction drive on the robotic mower to drive the robotic mower to the specified destination.

6. A robotic mower navigation system, comprising:
    a vehicle control unit on a robotic mower that directs the robotic mower to follow a path between a plurality of adjacent landmark tags and determines a distance between each of the plurality of adjacent landmark tags located within or along a yard perimeter, each of the plurality of landmark tags being adjacent to two landmark tags and non-adjacent to a plurality of other landmark tags; the stored data including a unique identifier for each landmark tag, the vehicle control unit directing the robotic mower to make passes inside the yard perimeter and determine a distance from each landmark tag to at least one other non-adjacent landmark tag, and a departure angle from each landmark tag to at least one other non-adjacent landmark tag; the vehicle control unit determining a route between the landmark tags to a docking station based on the distances and departure angles.

7. The robotic mower navigation system of claim 6 wherein each landmark tag is a passive RFID tag, and further comprising an RFID detector on the robotic mower.

8. The robotic mower navigation system of claim 6 wherein the vehicle control unit commands the robotic mower to go from a current location to a landmark tag before the vehicle control unit determines the route to the docking station.

9. The robotic mower navigation system of claim 6 further comprising a boundary sensor on the robotic mower that provides the vehicle control unit with signals regarding an angle of the boundary sensor with respect to a known axis.

10. A robotic mower navigation system, comprising:
    a boundary sensor on a robotic mower that senses an angle to a boundary wire; and
    a vehicle control unit on the robotic mower directing the robotic mower to make passes inside the boundary wire and that determines the angle and a distance between a landmark tag on the boundary wire and a plurality of other non-sequential landmark tags on the boundary wire, and directing the robotic mower on a path between selected non-sequential landmark tags.

11. The robotic mower navigation system of claim 10 wherein the vehicle control unit directs the robotic mower to a specified destination using the distance and the angle between a landmark tag and another non-sequential landmark tag on the boundary wire.

12. The robotic mower navigation system of claim 11 wherein the vehicle control unit computes the shortest distance to the specified destination using the distance and the angle between a landmark tag and another non-sequential landmark tag on the boundary wire.

13. The robotic mower navigation system of claim 10 wherein the boundary sensor has at least two pickup coils arranged in different orientations.

14. The robotic mower navigation system of claim 10 wherein the landmark tags are RFID tags, and further comprising an RFID detector on the robotic mower.

\* \* \* \* \*